US011513525B2

(12) United States Patent
Eoh et al.

(10) Patent No.: US 11,513,525 B2
(45) Date of Patent: Nov. 29, 2022

(54) SERVER AND METHOD FOR CONTROLLING LASER IRRADIATION OF MOVEMENT PATH OF ROBOT, AND ROBOT THAT MOVES BASED THEREON

(71) Applicant: LG ELECTRONICS INC., Seoul (KR)

(72) Inventors: Gyuho Eoh, Seoul (KR); Dong Ki Noh, Seoul (KR); Seungmin Baek, Seoul (KR); Jeong Sik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 16/696,719

(22) Filed: Nov. 26, 2019

(65) Prior Publication Data
US 2020/0174484 A1    Jun. 4, 2020

(30) Foreign Application Priority Data
Nov. 29, 2018    (KR) .......................... 10-2018-0150838

(51) Int. Cl.
G05D 1/02        (2020.01)

(52) U.S. Cl.
CPC .......... G05D 1/0214 (2013.01); G05D 1/024 (2013.01); G05D 1/0248 (2013.01); G05D 1/0276 (2013.01)

(58) Field of Classification Search
CPC .... G05D 1/0214; G05D 1/024; G05D 1/0248; G05D 1/0276
See application file for complete search history.

(56) References Cited

U.S. PATENT DOCUMENTS 6,629,028 B2   9/2003  Paromtchik et al.
2002/0027652 A1  3/2002  Paromtchik et al.

FOREIGN PATENT DOCUMENTS

CN    104867158 A  *  8/2015
CN    107063257 A     8/2017
(Continued)

OTHER PUBLICATIONS

English Translation of CN-104867158-A.*
(Continued)

*Primary Examiner* — Rami Khatib
*Assistant Examiner* — Shahira Baajour
(74) *Attorney, Agent, or Firm* — Birch, Stewart, Kolasch & Birch, LLP

(57) ABSTRACT

A main server for controlling laser irradiation of a movement path of a robot, the main server including a communication unit configured to communicate with a camera module and a laser irradiation module; and a controller configured to: receive, via the communication unit, an image of a robot captured by the camera module, identify a location of the robot in the image captured by the camera module, generate a movement path of the robot based on sensing information, and transmit, via the communication unit, movement path information to the laser irradiation module for outputting the movement path to a vicinity of the robot with a laser for the robot to follow, in which the sensing information includes first information about an obstacle sensed by the camera module or second information about the obstacle sensed by the laser irradiation module.

16 Claims, 14 Drawing Sheets

(56) References Cited

FOREIGN PATENT DOCUMENTS

| JP | 2014-104939 A | 6/2014 |
|---|---|---|
| JP | 2018-73027 A | 5/2018 |
| KR | 10-0948947 B1 | 3/2010 |
| KR | 10-2013-0093988 A | 8/2013 |
| KR | 10-1305401 A | 9/2013 |

OTHER PUBLICATIONS

English Translation of KR101305401.*
Chang et al., "Vision-Based Robot Navigation and Map Building Using Active Laser Projection," SI International, 2011, pp. 24-29.

* cited by examiner

FIG. 7
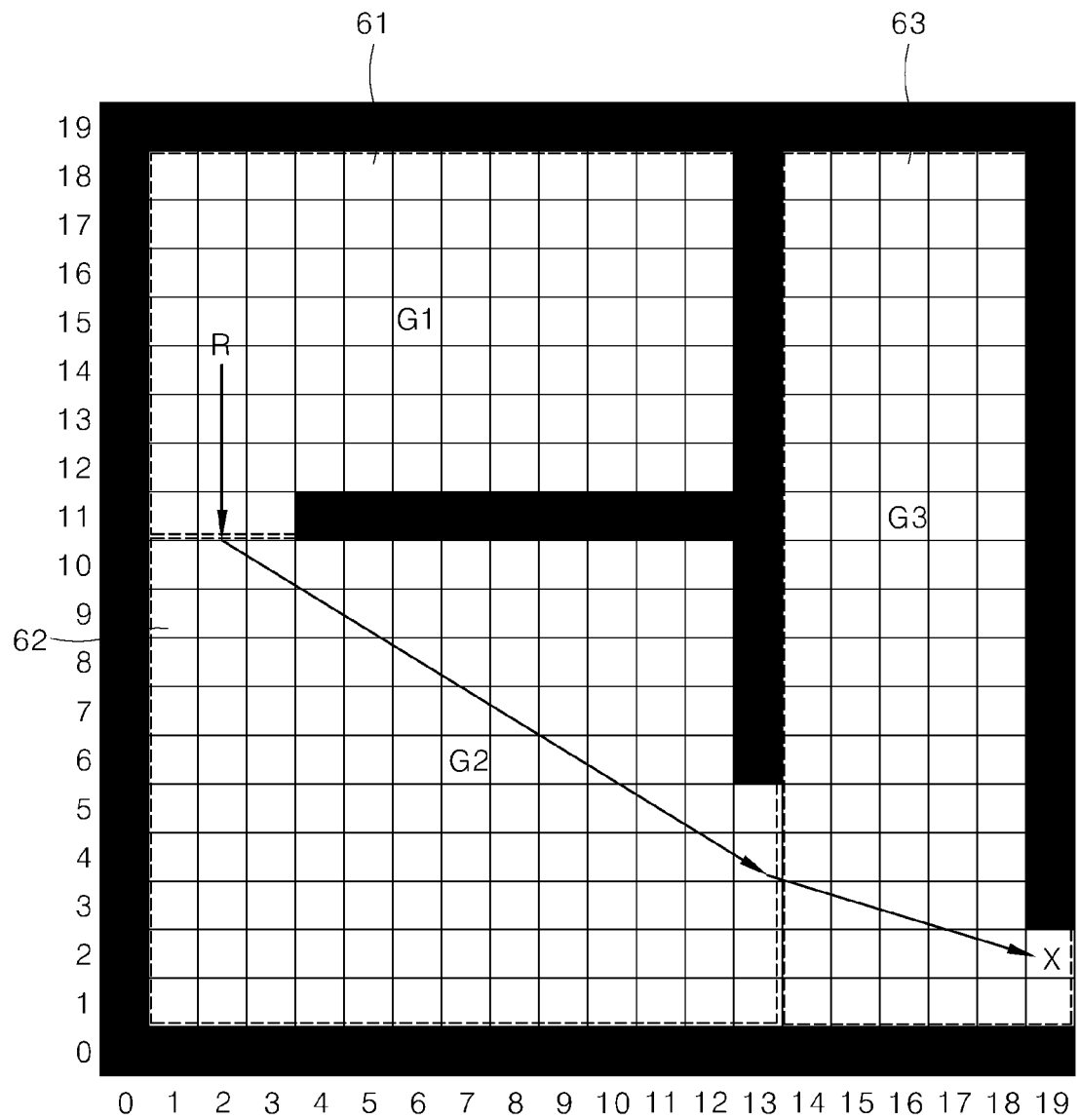
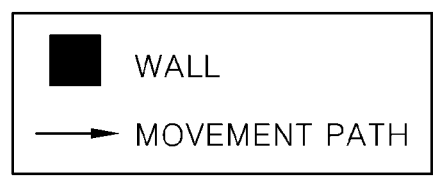

FIG. 8
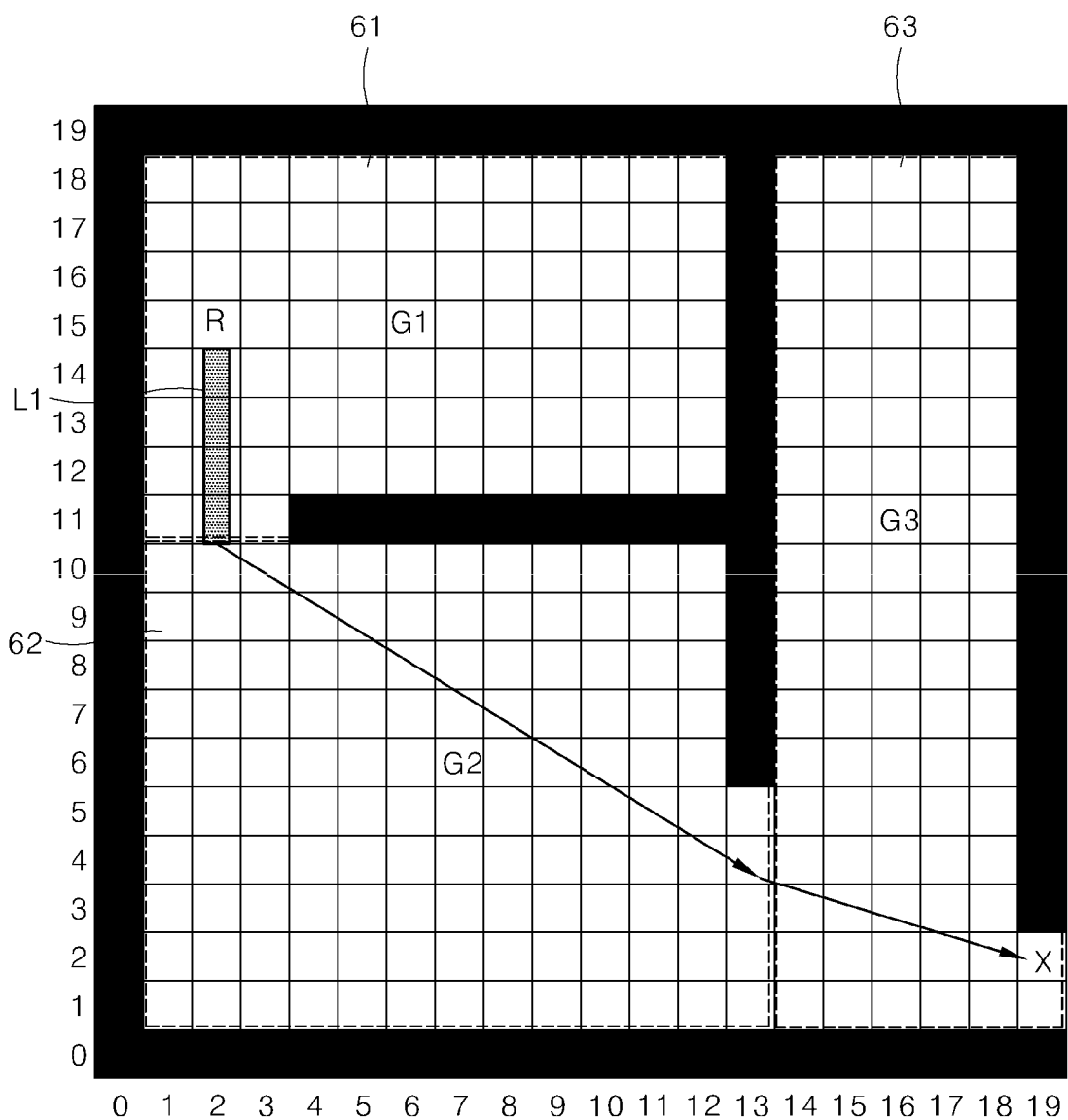
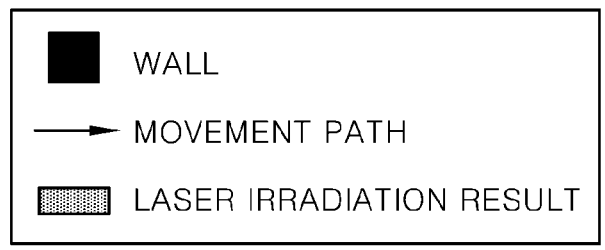

FIG. 9
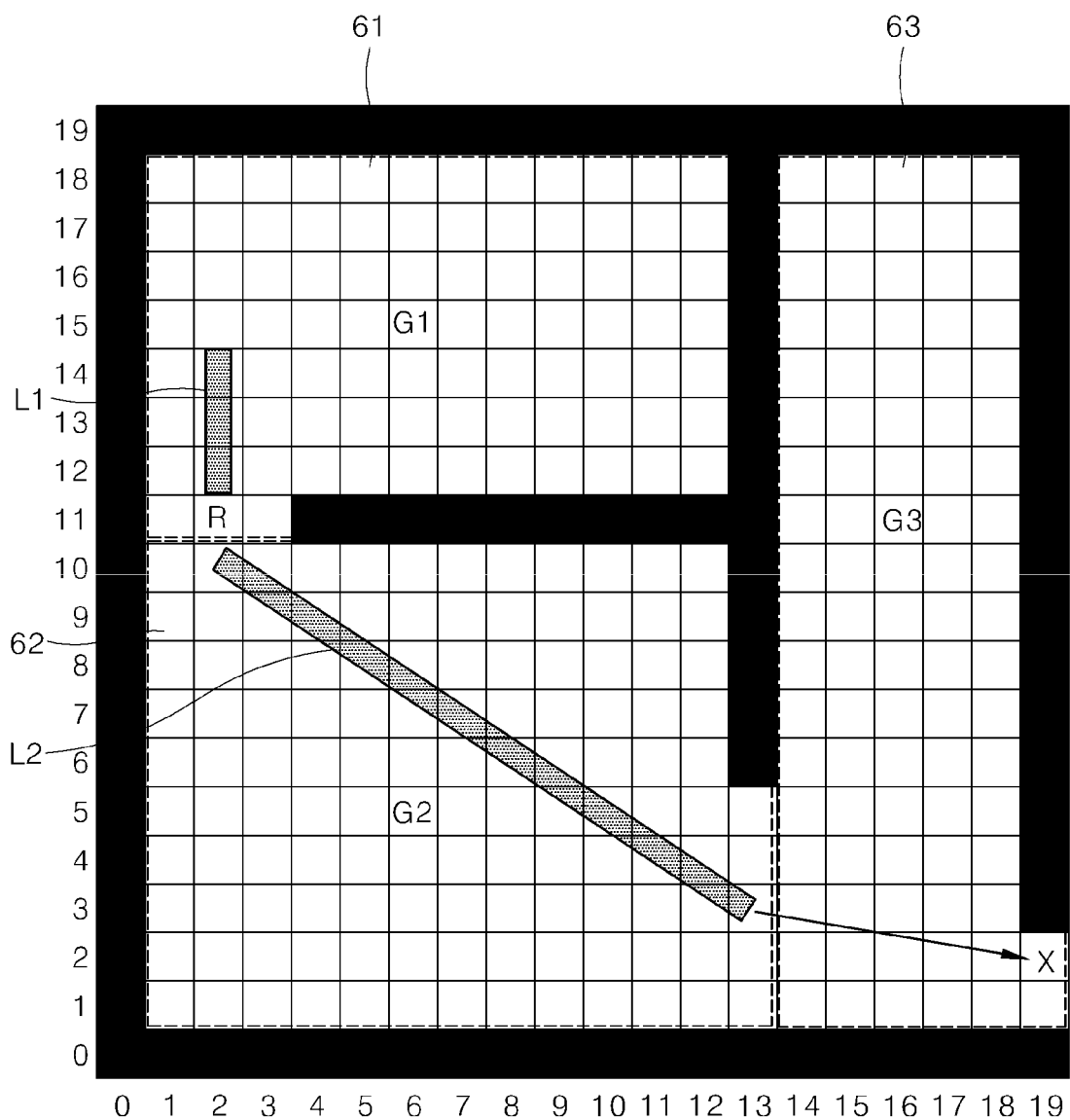
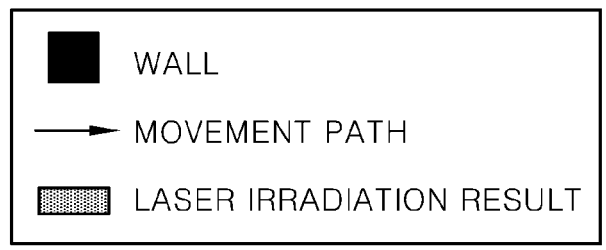

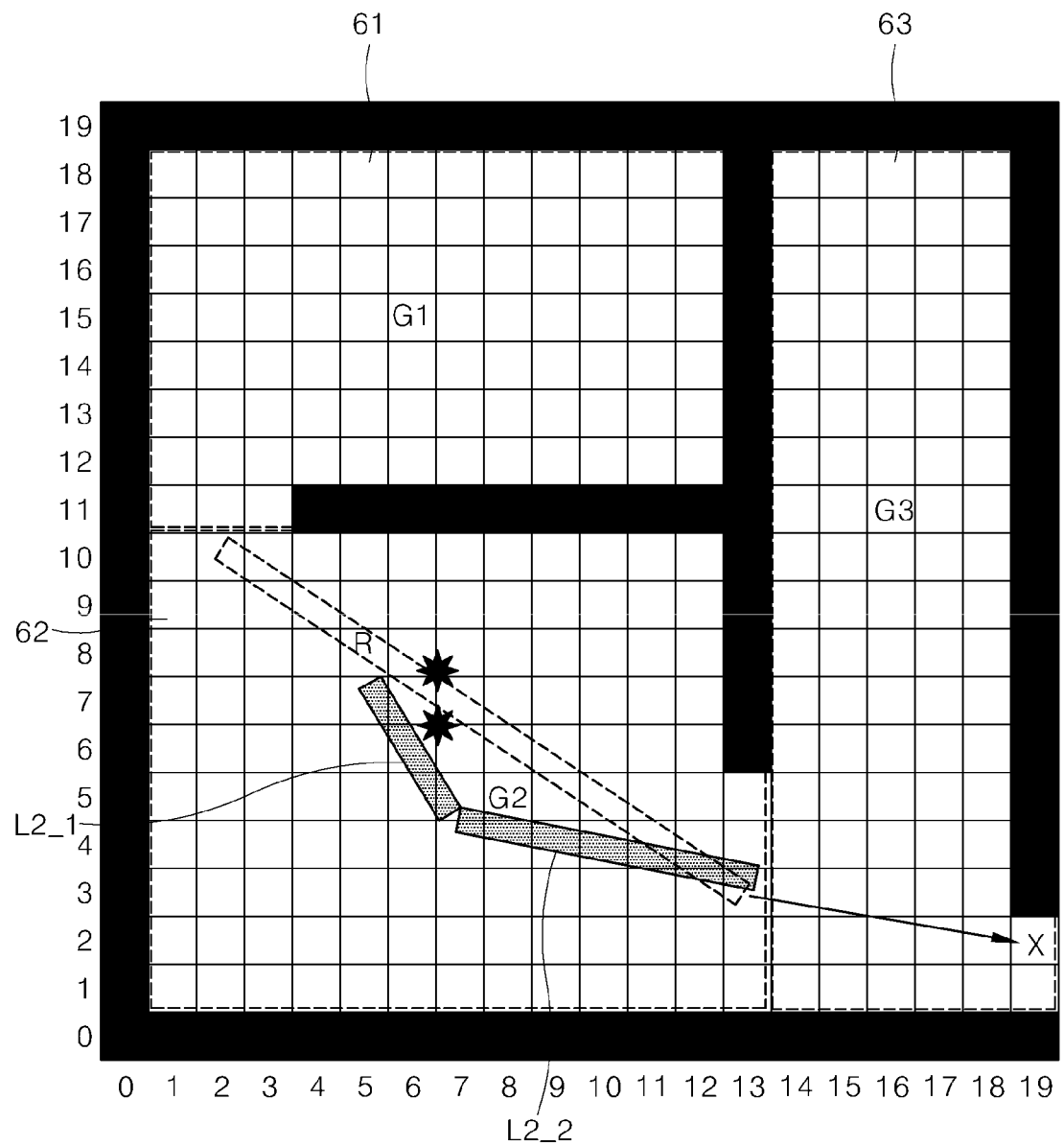
FIG. 11
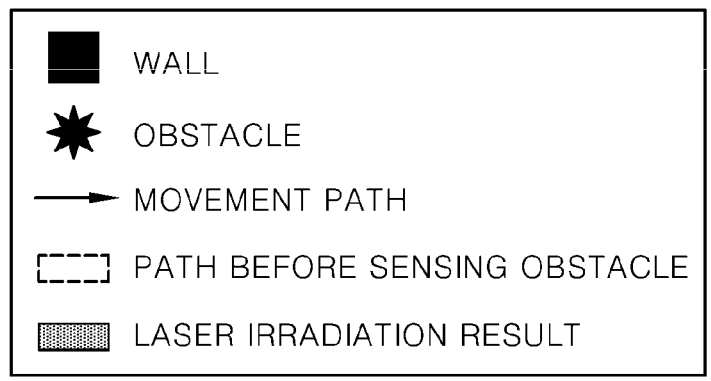

FIG. 13

| | LINE OUTPUT | | DOT OUTPUT | |
|---|---|---|---|---|
| DRIVING DIRECTION | ↑ R | | ↑ R | |
| LASER OUTPUT SHAPE | HIGH-SPEED DRIVING | SLOWDOWN | HIGH-SPEED DRIVING | SLOWDOWN |

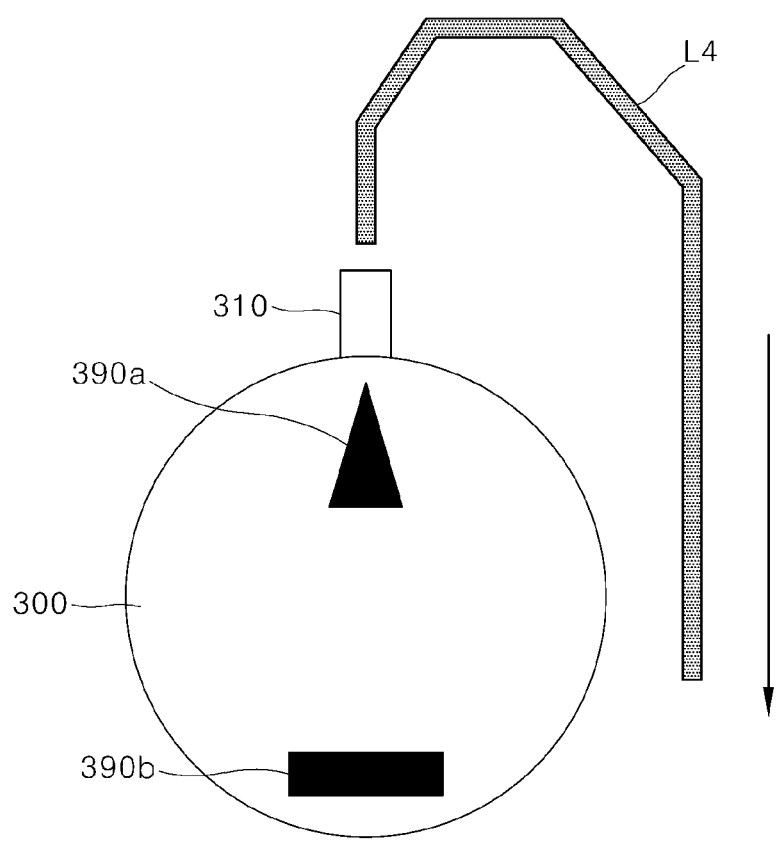

ered by the main server according to an embodiment of the
SERVER AND METHOD FOR CONTROLLING LASER IRRADIATION OF MOVEMENT PATH OF ROBOT, AND ROBOT THAT MOVES BASED THEREON

CROSS-REFERENCE TO RELATED APPLICATION

This application claims priority benefit under 35 U.S.C. § 119 to Korean Application No. 10-2018-0150838, filed on Nov. 29, 2018, the entirety of which is herein incorporated by reference.

BACKGROUND

1. Field of the Invention

The present disclosure relates to a server and a method for controlling laser irradiation of a movement path of a robot, and a robot that moves based thereon.

2. Description of Related Art

A robot may move in various ways. The robot may store a map for the entire space and create movement paths on the map. Alternatively, the robot may sense an ambient obstacle without any map and generate a path so as to avoid the sensed obstacle.

This approach requires the robot to form a predetermined path, which means that the robot requires computing power for path generation. In addition, there is a limitation in terms of a travel speed of the robot in that the robot should be combined with various sensors to sense various obstacles, and a route is recalculated at a time point of travel.

Conventional technology has a configuration in which a target point of a robot is marked by means of a laser pointer, and the robot moves toward the target point. The configuration will be described in more detail with reference to FIG. 1.

FIG. 1 illustrates a configuration of irradiating a target point of a robot with a laser pointer according to the related art. As illustrated in FIG. 1, a laser pointer 16 irradiates (or scans) a laser beam to notify a direction of a robot 12. The laser beam mounted on a ceiling indicates a point where the robot should go next, and the robot uses its built-in camera to find the beam and recognizes a direction thereof through image analysis, which suggests a technical configuration to allow the robot to travel by marking the target point with a laser.

In the configuration as illustrated in FIG. 1, the robot may move along the irradiated laser beam. However, since a region in which the laser beam is irradiated is provided as a point, it is necessary to generate a path required to move to the target point, and an obstacle also needs to be sensed by the robot.

That is, there is a limitation in that an amount of calculations which the robot needs to perform is still high and additional computing resources for obstacle avoidance are required. The aforementioned matters also limit the driving speed of the robot also has a limitation.

Thus, the present disclosure suggests a method for irradiating a high-speed route with respect to travel of a robot, and allowing the robot to recognize and travel the high-speed route.

SUMMARY

In order to solve the above-described problems, the present disclosure is directed to providing a robot capable of receiving a path via a main server without sensing an external obstacle or calculating the path in the process of moving, and moving at a high speed by allowing the path to be marked with a laser.

The present disclosure is further directed to providing a method and an apparatus for providing a robot with a final result about a path by allowing a main server to generate information about a movement space of the robot and the path.

The present disclosure is not limited to the above-described aspects, and other aspects and advantages of the present disclosure can be appreciated by those skilled in the art based on the following description and will be understood more clearly from embodiments of the present disclosure. In addition, it will be appreciated that the aspects and advantages of the present disclosure will be easily realized by those skilled in the art based on the appended claims and a combination thereof.

Also this work was supported by the ICT R&D program of MSIT/IITP[2017-0-00306, Development of Multimodal Sensor-based Intelligent Systems for Outdoor Surveillance Robots.

According to an embodiment of the present disclosure, there is provided a main server configured to control laser irradiation of a movement path of a robot. The main server may include a location identifying unit configured to identify a location of a robot in an image photographed by a camera module. The main server may include a controller configured to generate a movement path of the robot and control transmission of the movement path to a laser irradiation module capable of outputting the movement path to a vicinity of the robot with a laser. The location identifying unit can be included in the controller.

According to another embodiment of the present disclosure, there is provided a robot that moves based on laser irradiation of a movement path. The robot may include a laser sensor configured to sense a laser output onto a ground. The robot may include a driving unit configured to allow the robot to move, and a controller configured to control the driving unit of the robot according to a laser sensed by the laser sensor to allow the robot to move.

According to still another embodiment of the present disclosure, there is provided a method for controlling laser irradiation of a movement path of a robot. The method may include receiving, by a communication unit, an image photographed by a camera module from the camera module or a guiding device including the camera module, identifying, by a location identifying unit, a location of the robot in the image photographed by the camera module, generating, by a controller, a movement path of the robot, selecting, by the controller, a laser irradiation module capable of outputting the movement path to a vicinity of the robot with a laser, and, transmitting, by the communication unit, the movement path to the selected laser irradiation module or to a guiding device including the laser irradiation module.

BRIEF DESCRIPTION OF THE DRAWINGS

FIG. 7 illustrates information of a space stored in map storage according to an embodiment of the present disclosure.

FIG. 8 illustrates a process of outputting a path with a laser by a laser irradiation module of G1 according to an embodiment of the present disclosure.

FIG. 9 illustrates a process of outputting a path with a laser by a laser irradiation module of G2 according to an embodiment of the present disclosure.

FIG. 11 illustrates a result of correcting a path according to an embodiment of the present disclosure.

FIG. 13 illustrates an example of a laser output reflecting characteristics of a movement path according to an embodiment of the present disclosure.

FIG. 14 illustrates an example of laser irradiation when two marks are disposed on a robot according to an embodiment of the present disclosure.

DETAILED DESCRIPTION OF THE EMBODIMENTS

Figure 1:
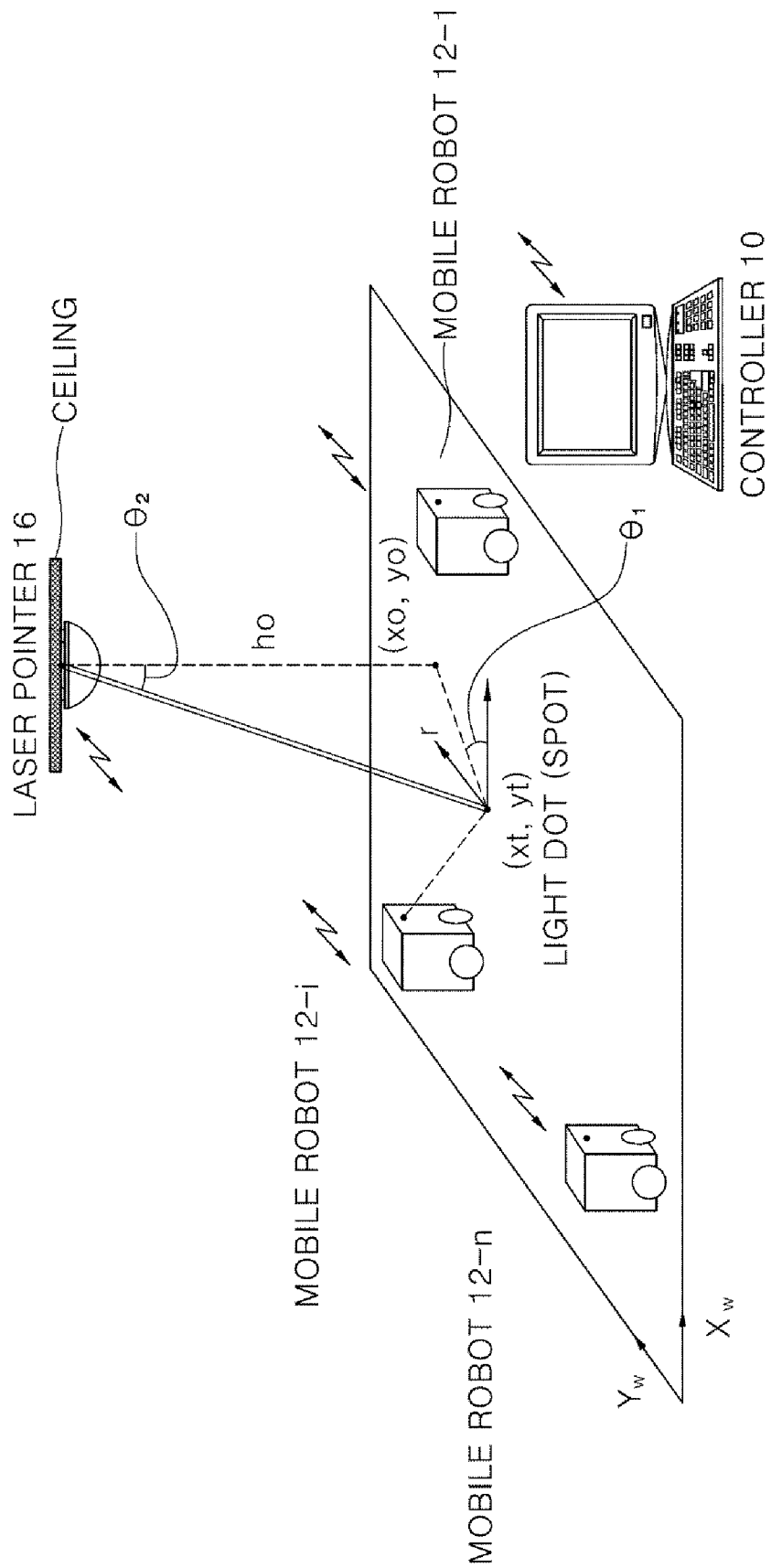
FIG. 1 illustrates configuration of irradiating a target point of a robot with a laser pointer according to the related art.

Hereinafter, embodiments of the present disclosure will be described in detail so that those skilled in the art can easily carry out the embodiments. The present disclosure may be embodied in various different forms and is not limited to the embodiments set forth herein.

Hereinafter in order to clearly describe the present disclosure, parts that are not directly related to the description are omitted. Further, like reference numerals are used for like or similar components throughout the specification. In addition, some embodiments of the present disclosure will be described in detail with reference to the drawings. In adding reference numerals to components of each drawing, it should be understood that the same reference numeral is used for the same component even if the component is shown in different drawings. In describing embodiments of the present disclosure, when it is determined that the detailed description of a related known function or configuration renders the scope of the present disclosure unnecessarily ambiguous, the detailed description thereof will be omitted.

It will be understood that, although the terms first, second, A, B, (a), (b), etc. may be used herein to describe various components of the present disclosure, these terms are only used to distinguish one component from another component and an order, or sequence of corresponding components are not limited by these terms. It will be understood that when one component is referred to as being "connected to," "coupled to," or "linked to" another component, one component may be "connected to," "coupled to," or "linked to" another component via a further component although one component may be directly connected to or directly linked to another component.

Further, in implementing embodiments of the present disclosure, features may be described as being performed by separate components for convenience of description. However, these features may be implemented by a single device or module or a feature may be implemented by several devices or modules.

Hereinafter, a robot collectively refers to an apparatus that performs a specific function. Functions performed by the robot include various functions that can be provided by a mobile apparatus, for example, functions of cleaning, crime prevention, guidance, security functions, and the like. In addition, the robot disclosed herein includes a robot that transports an article, for example, a logistics cart robot or a delivery robot, or a robot that assists a user. That is, the robot according to embodiments of the present disclosure collectively refers to an apparatus that moves, travels or drives while providing a specific function to meet a user's needs.

Figure 2:
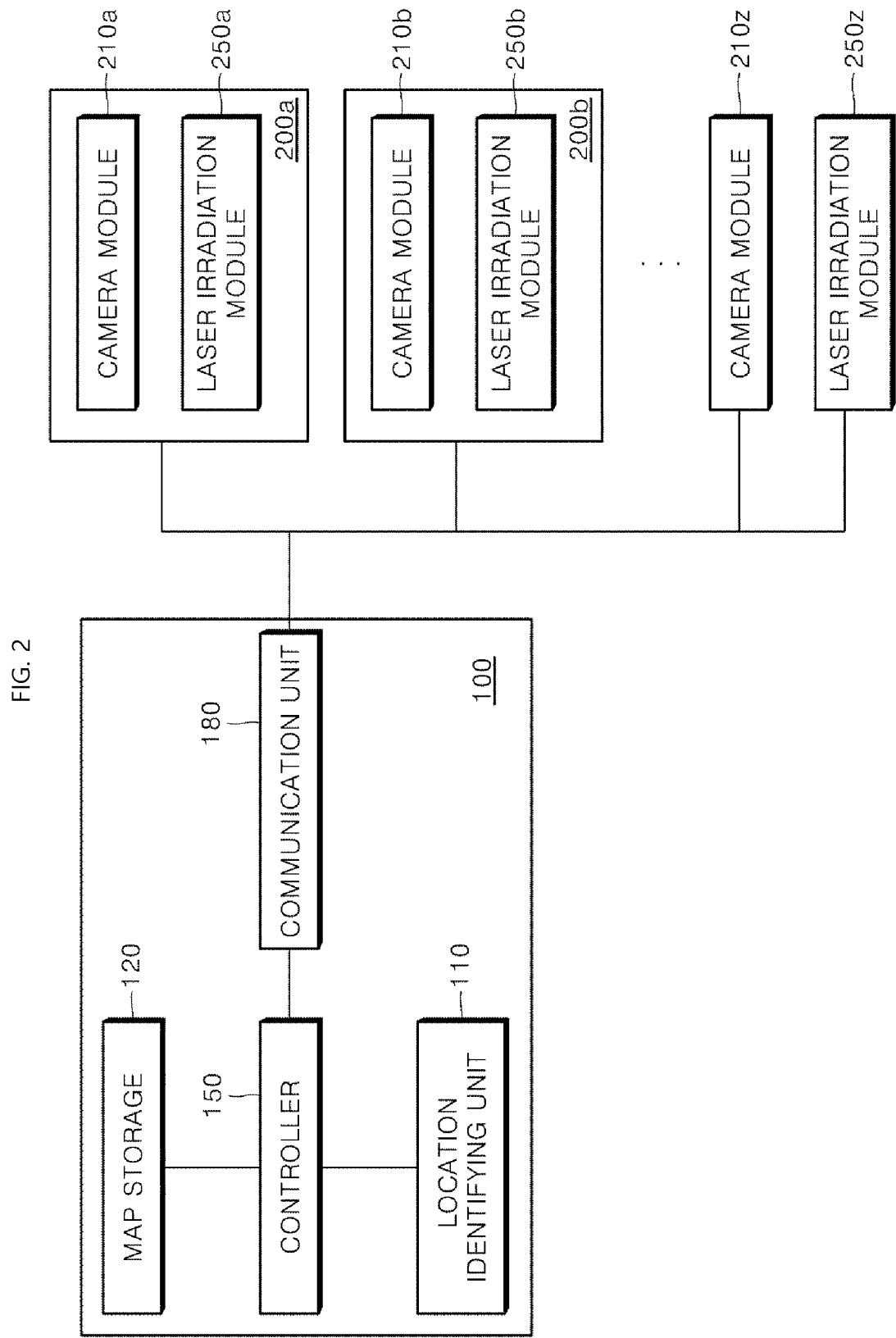
FIG. 2 illustrates a relationship between a main server, and a camera module and a laser irradiation module controlled by the main server according to an embodiment of the present disclosure.

FIG. 2 illustrates an example relationship between a main server, and a camera module and a laser irradiation module controlled by the main server.

In one embodiment, a main server 100 may be a computer that performs a sort of server function. The main server 100 may estimate a location of a robot. For example, the main server 100 may estimate the location of the robot (mobile robot) by analyzing an image acquired by a camera module. In addition, the main server 100 may generate a path through path planning. For example, the main server 100 may perform calculations required for complicated path planning to a destination by using the acquired robot location. The main server 100 may output a path obtained as a result of performing calculations to a vicinity of the robot by controlling a laser irradiation module. The main server 100 may recalculate the path based on travel of the robot, a change of a surrounding situation, and the like.

The main server 100 may include a controller 150, a communication unit 180, a location identifying unit 110, and optionally a map storage 120. Camera modules 210a and 210b and laser irradiation modules 250a and 250b may be integrally included in guiding each devices 200a and 200b. Alternatively, a camera module 210z and a laser irradiation module 250z may be disposed independently.

The communication unit 180 may communicate with the camera modules 210a, 210b, and 210z and the laser irradiation modules 250a, 250b, and 250z. Alternatively, the communication unit 180 may communicate with the guiding devices 200a and 200b including the two modules. The communication unit 180 may receive an image photographed by the camera modules 210a, 210b, and 210z. The image may include an image of the robot and a mark disposed on the robot to identify a location or direction of the robot.

The communication unit 180 may receive an image including a mark disposed on the robot from the camera modules 210a and 210b. In addition, the communication unit 180 may transmit detailed information about a laser signal to be output by the laser irradiation module 250a, 250b, and 250z.

The location identifying unit 110 may identify the location of the robot in the image photographed by the camera modules 210a, 210b, and 210z. The location identifying unit 110 may identify absolute location information of the robot based on physical information of the camera modules 210a, 210b, and 210z and relative location information of the robot in the image. The location identifying unit 100 can be incorporated to the controller 150. In this situation, the controller 150 may identify the location of the robot.

The controller 150 may generate a movement path of the robot. The controller 150 may control transmission of the movement path to the laser irradiation modules (any one or more of 250*a*, 250*b*, . . . , 250*z*) capable of outputting the movement path to the vicinity of the robot with a laser.

The main server 100 may optionally include a map storage 120 configured to store a location of each robot, a location of the camera module, a location of the laser irradiation module, a location of the obstacle, and the like. The location of the obstacle stored in the map storage 120 is a region where the robot cannot move or travel. Therefore, the main server 100 may refer to the location of the obstacle stored in the map storage 120 to identify a region where the robot should avoid in generating a movement path of the robot.

In addition, even when the robot is out of range of a specific camera module or laser irradiation module while the robot moves, other adjacent camera modules and laser irradiation modules may allow the robot to continuously check or confirm the route depending on the location of each camera module and laser irradiation module.

In the present disclosure, a system configured to irradiate a path to a robot may consist of three components. In some implementation, the system may consist of the main server 100 configured to identify a location of a specific robot and calculate a path so that the robot moves, a camera module 210 configured to photograph a location of the robot or surrounding objects of the robot, and a laser irradiation module 250 that is a path output device configured to scan the route to the vicinity of the robot. These components may be configured independently of each other, and may transmit and receive information via a communication function.

In FIG. 2, instead of the laser irradiation module, a light irradiation module configured to irradiate light having characteristics such as different wavelengths or different frequencies may be disposed. In this situation, the light irradiation module may be disposed in the guiding device, and a laser sensor of the robot, which will be described later, may also be replaced by a light sensor.

Figure 3:
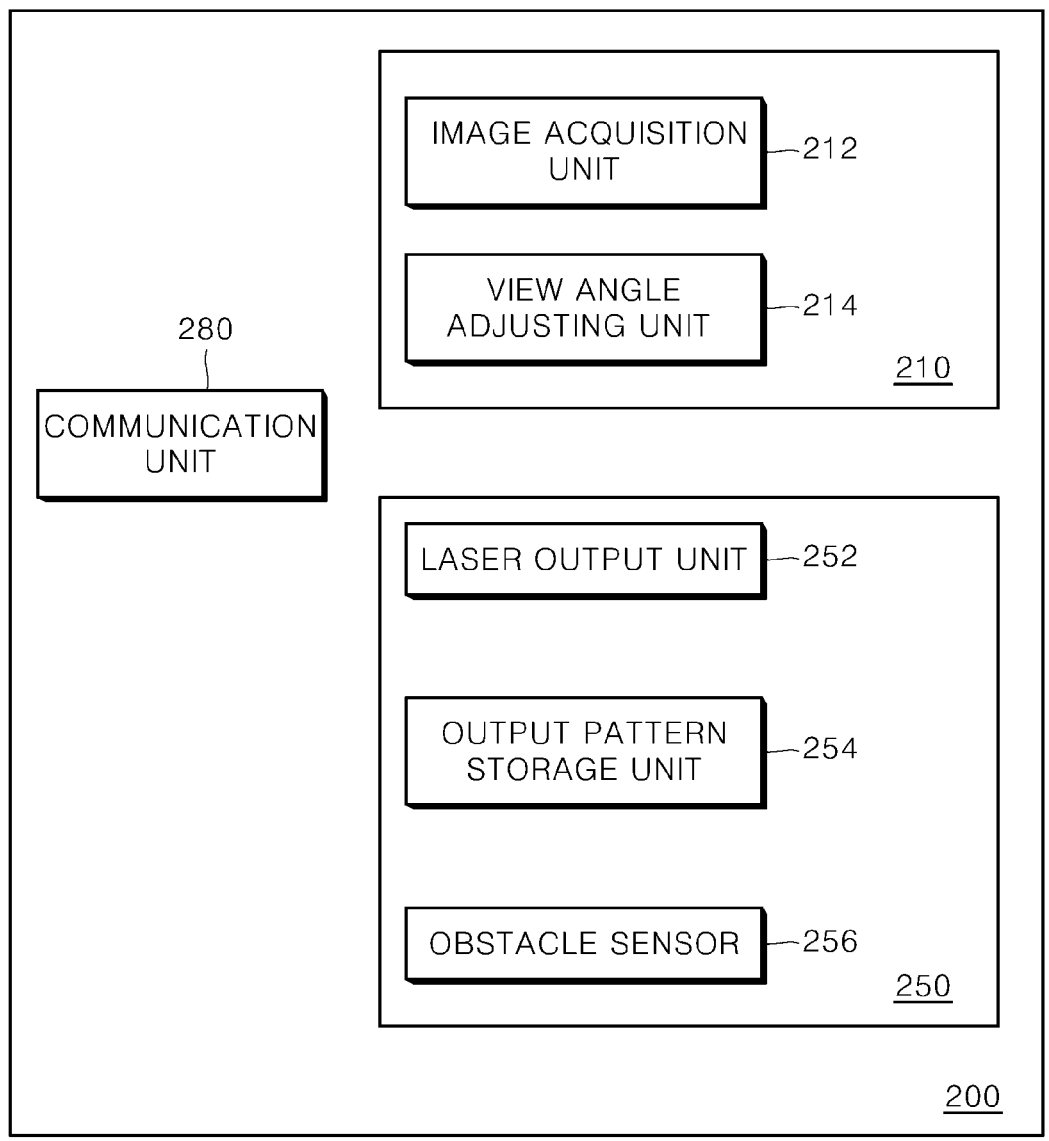
FIGS. 3 and 4 illustrate a configuration of a guiding device according to embodiments of the present disclosure.
Figure 4:
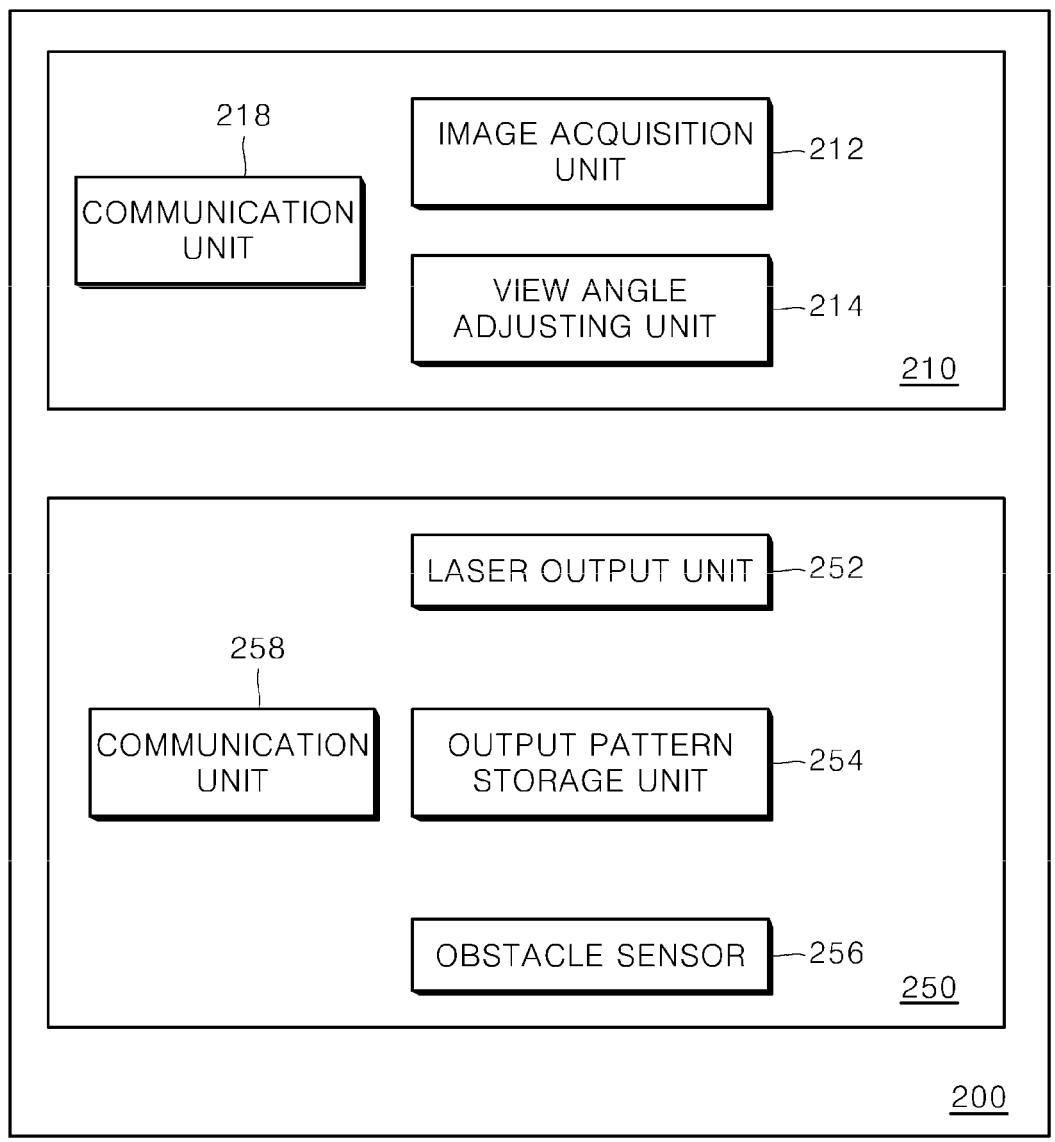

FIGS. 3 and 4 illustrate a configuration of a guiding device.

A guiding device 200 may include one camera module 210 and one laser irradiation module 250, as illustrated in FIG. 3. The communication unit 280 may be disposed in the guiding device 200. The camera module 210 may be attached to a ceiling or a wall surface, and may figure out a current location of a robot by recognizing a location mark mounted on the robot. The laser irradiation module 250 may project a line laser onto a floor surface with respect to a route to be traveled by the robot.

Alternatively, as illustrated in FIG. 4, the communication unit 218 may be disposed in the camera module 210 or the communication unit 218 may be disposed in the laser module 250. When the communication unit is disposed in only one among the two modules, the other module may use the communication unit 218.

For example, when the communication unit 218 is disposed only in the camera module 210, the laser irradiation module 250 may communicate with the main server 100 via the camera module 210. Similarly, when the communication unit 258 is disposed only in the laser irradiation module 250, the camera module 210 may communicate with the main server 100 via the laser irradiation module 250.

Unlike FIG. 3 and FIG. 4, one guiding device 200 may include m camera modules 210 and n laser irradiation modules 250 (where m and n may be one or more natural numbers).

In FIGS. 3 and 4, the camera module 210 may include an image acquisition unit 212 configured to photograph an image and a view angle adjusting unit 214 for accuracy of image acquisition. When the camera module 210 transmits an image to the main server 100, the camera module 210 may transmit information about which direction and at what magnification the image is photographed together with the image.

In FIGS. 3 and 4, the laser irradiation module 250 may include a laser output unit 252 configured to output a laser and an output pattern storage unit 254. The laser output unit 252 may output a laser in a specific manner according to instructions of the main server 100. In outputting a laser, the output pattern storage unit 254 may store a pattern such as a shape, color, frequency, or the like of a laser to be output. This implementation may allow the robot to move according to a laser output of a pattern assigned to itself by outputting a laser in a different pattern for each robot even when routes are arranged adjacent to each other.

In addition, in FIGS. 3 and 4, the laser irradiation module 250 may further include an obstacle sensor 256. The obstacle sensor 256 may sense a signal reflected after a laser is output, thereby being capable of identifying whether there is an obstacle on the ground where the laser is projected according to characteristics of the reflected signal.

Of course, when the image acquisition unit 212 of the camera module 210 continuously acquires one or more images, and a photographed object is different from a previously photographed one and the photographed object is not a robot, the photographed object may be identified as an obstacle. The main server 100 may identify whether the obstacle is newly disposed in real time by using the camera module 210 or the laser irradiation module 250, and may update the map storage 120.

The communication unit 380 illustrated in FIG. 3 or FIG. 4 may communicate in a suitable manner among a wired communication and a wireless communication in performing communication with the main server 100.

Figure 5:
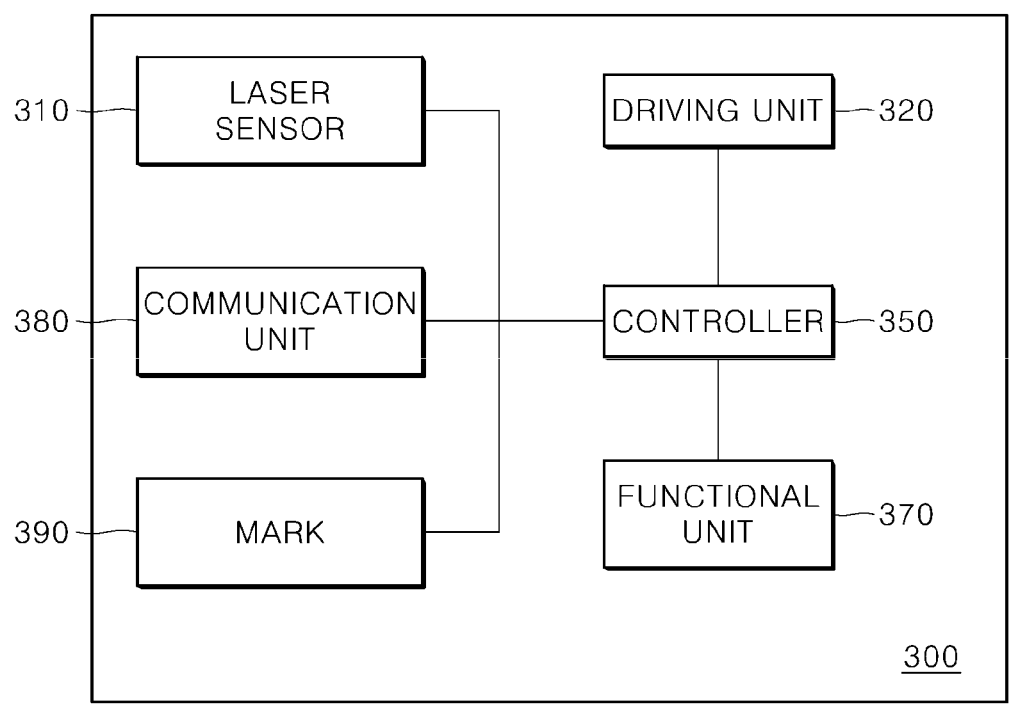
FIG. 5 illustrates a configuration of a mobile robot according to an embodiment of the present disclosure.

FIG. 5 illustrates a configuration of a mobile robot. The mobile robot 300 may include a laser sensor 310 configured to sense a laser output onto the ground and a driving unit 320 configured to allow the robot to move. The controller 350 may allow the robot to move by controlling the driving unit 320 of the robot according to a laser sensed by the laser sensor 310. The laser sensor 310 may consist of sensor arrays for sensing a laser. The laser sensor 310 may be disposed toward the ground to sense a laser marked on the ground.

A functional unit 370, which is a component configured to allow the mobile robot to perform a specific function, may provide a cleaning function in the situation of a cleaning robot, and may provide security and guard functions in the situation of a security guard robot.

In addition, the mobile robot 300 may selectively further include the communication unit 380, which may receive information from any one or more among the main server 100, the camera module 210, and the laser irradiation module 250. Of course, the communication unit 380 may receive information from the guiding device 200 including the camera module 210 or the laser irradiation module 250.

When the communication unit 380 communicates with the main server 100, the communication unit 380 may be configured not to receive information about a path since the path is marked on the ground via the laser irradiation module 250. However, the communication unit 380 may receive instruction information from the main server 100 to allow the mobile robot 300 to perform a specific function, or may wirelessly communicate with the main server 100 for a function of upgrading the mobile robot 300 and the like.

In addition, the mobile robot 300 may also include a mark 390 to identify the robot in the image photographed by the camera module 210 or to identify a direction of the robot. The mark 390 may be a fixed image, a QR code, a barcode, or the like. Alternatively, the mark 390 may include a sort of electronic display device. The mark 390 including a small-sized liquid crystal display (LCD) device or a small-sized organic light emitting diode (OLED) device may output a specific image or a specific color by control of the controller 350.

When the camera module 210 photographs the mark 390 and transmits the photographed image to the main server 100, the main server 100 may identify identification information of the robot photographed in the image. In addition, when the laser sensor 310 of the robot is disposed at a specific position of the robot 300, the mark 390 may be disposed to identify the front or the back of the robot 300 in the image for more precise control.

In addition, one or more marks 390 may be disposed. According to an embodiment of the present disclosure, a mark disposed adjacent to the laser sensor 310 and a mark disposed far from the laser sensor 310 may be configured differently so that a travel direction (a front surface or a back surface) of the robot is easily identified in the image.

Figure 6:
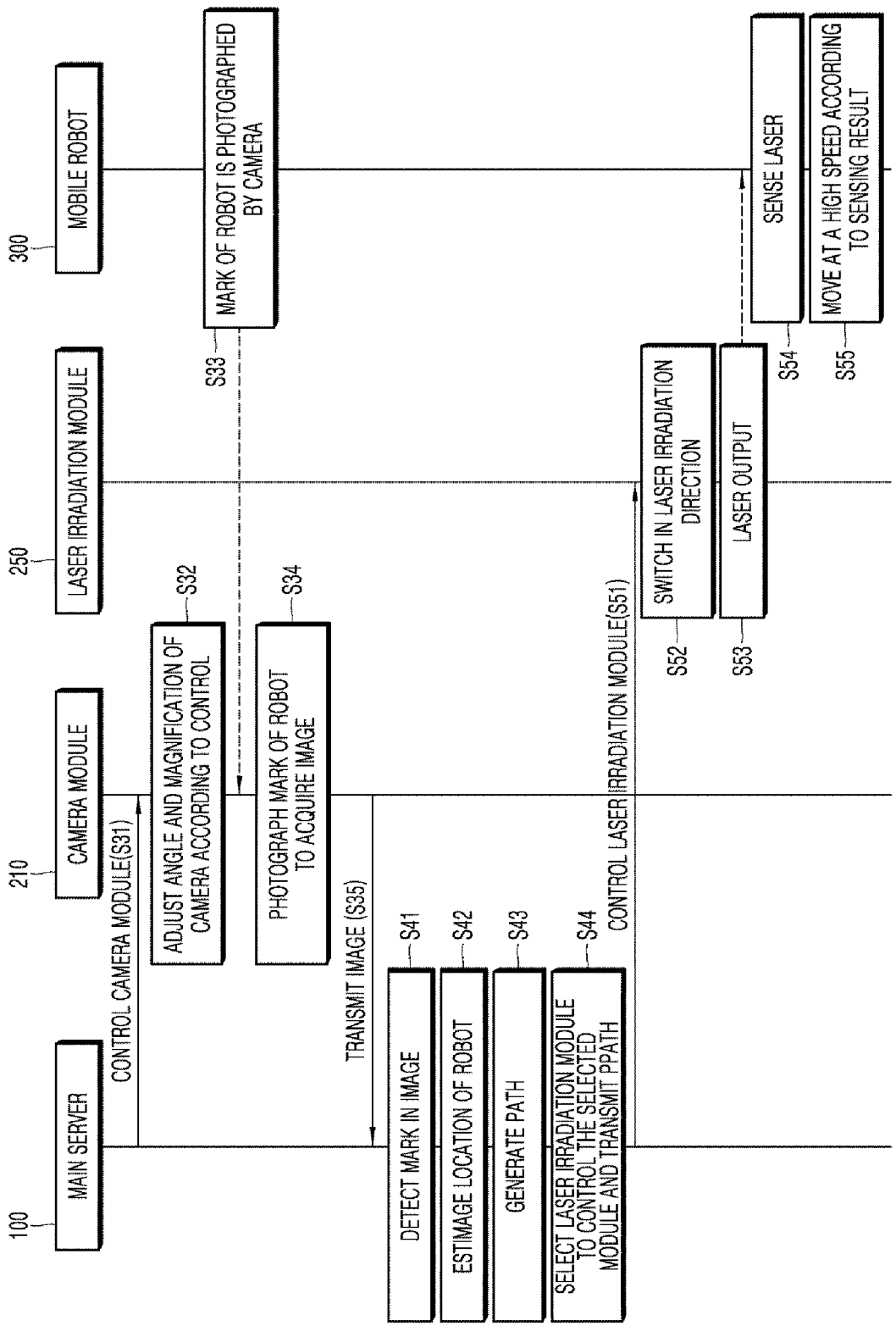
FIG. 6 illustrates an interaction between respective components according to an embodiment of the present disclosure.

FIG. 6 illustrates an interaction between respective components according to an embodiment of the present disclosure. The main server 100 may control the camera module 210 in step S31, and the camera module 210 may adjust an angle and magnification of a camera according to the control in step S32. For example, the main server 100 may control the image acquisition unit 212 to face the robot to allow the image acquisition unit 212 to acquire an image of the robot and an image of a mark of the robot, or may adjust a direction to find the robot.

As described above, one guiding device may include a camera module and a laser irradiation module, and the communication unit 180 of the main server 100 may receive an image photographed by the camera module from the camera module and the guiding device including the camera module.

That is, a mark of the mobile robot 300 may be photographed by the camera by adjusting a direction or magnification of the camera module 210 in steps S33 and S34. The camera module 210 may acquire an image by photographing a mark of the mobile robot 300 in the step S34, and may transmit the image to the main server 100 in step S35. In the step S33, a dotted arrow toward the camera module 210 means that the camera module 210 identifies the mark through a photographing method, rather than a data transmission/reception method. That is, the camera module 210 may acquire information of the mark of the mobile robot 300 without data transmission and reception.

Next, the main server 100 may detect the mark in the transmitted image in step S41. When the mark is not clearly detected or it is required to acquire a more accurate image, the step S31 may start again.

The main server 100 may estimate a location of the robot by using the mark in the image in step S42. The main server 100 may generate a path by using information about a destination to which the corresponding mobile robot should arrive and location information of the robot in step S43. Here, a map stored in the main server 100 may be used for the path.

When there is no obstacle between the destination and the robot's current location, a path may be generated in a straight line. Otherwise, when generating a path where the mobile robot 300 should travel, the main server 100 may subdivide the path.

The main server 100 may select a laser irradiation module, control the selected laser irradiation module, and transmit the path to the laser irradiation module so that the path is output to a front portion of the robot with a laser in step S44. By means of the main server 100, the laser irradiation module 250 may switch a direction of the laser output unit to a direction in which a laser should be irradiated in step S52, and may output a laser in step S53.

In addition, the laser sensor 310 of the mobile robot 300 may sense the output laser in step S54, and may perform a high-speed driving according to a result of sensing the output laser in step S55. A dotted line from the laser output of the step S53 toward the mobile robot 300 indicates that the mobile robot 300 acquires information of a route through the laser output, rather than that the laser irradiation module 250 transmits data to the mobile robot 300.

The following is a summary of a process of FIG. 6. The camera module 210 may photograph an image and transmit the image to the main server 100 in steps S31 to S35. Thereafter, the main server 100 may analyze the transmitted image, detect a robot location mark, and recognize a current location of the robot based thereon in steps S41 and S42.

In addition, the main server 100 may perform a path planning by using the current location and a target point of the robot to generate a path in step S43. Thereafter, the main server 100 may project the route onto a floor surface by using the laser irradiation module 250 in steps S51 to S53, and the mobile robot 300 may detect the protected laser by using the laser sensor 310 consisting of the sensor arrays in step S54.

The mobile robot 300 may move at a high speed to the target point along the path of the projected laser in step S55. The steps S31 to S55 may be repeatedly performed. Here, a location error occurring during the movement or a change of the target point may be newly updated through an iterative routine to be reflected in planning and generating a path. Through this process, the mobile robot 300 may arrive at the target point.

In FIG. 6, the laser irradiation module 250 may output a laser in the shape of a line. In addition, the laser irradiation module 250 may output a laser in the shape of a dot to control a speed of the mobile robot 300, and the speed of the mobile robot 300 may be controlled by increasing or decreasing a distance between dots. Alternatively, the laser irradiation module 250 may output a laser in the shape of a line to control the speed of the mobile robot 300, and a width or color of the line may be configured differently.

According to the above-described embodiments, a path may be irradiated based on a laser for a high-speed driving of the robot, and the robot may recognize the irradiated path and travel at a high speed. Here, since an amount of calculations which may occur when planning a route for the high-speed travel of the robot is handled by the main server 100, the robot may solve a problem related to the amount of calculations in generating a route.

That is, actual calculations required for route generation may be handled by a main server computer, and thus path planning and path generation resulting from the path planning may be output to the floor via a laser. Therefore, each robot may move at a high speed with only laser sensing and motor control without the need of autonomously calculating with respect to a route.

According to the embodiments of FIGS. 2 and 6, a fixed camera module and a laser may be used to irradiate a route to be traveled by the robot with the laser onto a peripheral ground of the robot. The robot may recognize the irradiated route and travel at a high speed.

The above-described embodiments may be applied to a guard robot, a cleaning robot, a security robot, a guide robot, or the like depending on a function of the robot. The guard robot or security robot needs to travel at a high speed in situation of emergency. However, when traveling only with a calculation capability built in the robot, an amount of calculations required for obstacle search, route generation, and the like may tremendously increase, and accordingly a travel speed of the robot may be slowed down.

However, according to the embodiment of FIG. 6, in order to overcome this technical limitation, the camera module fixed to an upper portion in the space where the robot moves may be interlocked with the main server, and the laser irradiation module may irradiate a route for high-speed travel calculated by the main server so that the route is marked in the shape of a line or a dot on the floor.

As a result, the robot may use the laser sensor specialized for detecting a laser such as a line or a dot, and follow the line or the dot without any calculation, thereby being capable of travelling at a high speed.

The main server may control a fixed pan-tilt type camera module such as a guiding device and a laser irradiation module for outputting a laser in a line or a dot. The laser irradiation module may continuously irradiate a virtual line onto the ground according to a location and speed of the robot.

The robot may be provided with a sensor array module (laser sensor) capable of detecting a line or a dot irradiated with a laser, and the controller 350 of the robot may read information sensed by each sensor array and directly transmit the information to the driving unit 320 without any calculation. As a result, the robot may move at a high speed by reducing an amount of calculations required for the robot's move on path based on a control manner of being directly connected to a laser route on the ground, the laser sensor, and the driving unit.

FIG. 7 illustrates information of a space stored in map storage according to an embodiment of the present disclosure. For convenience of description, it is assumed that a camera module and a laser irradiation module are disposed in one guiding device, and a range in which the camera module is capable of photographing and a range in which the laser irradiation module is capable of outputting a laser are the same.

However, as described above, the camera module and the laser irradiation module may be configured in a ratio of m:n, and respective camera modules and laser irradiation modules may have different photographing ranges and irradiation ranges.

The guiding device may be installed on the ceiling at points marked with G1, G2, and G3. That is, G1, G2, and G3 mean locations where camera modules and laser irradiation modules are disposed. 61 is a photographing range of a camera module and a laser output range of a laser irradiation module of G1. 62 is a photographing range of a camera module and a laser output range of a laser irradiation module of G2. 63 is a photographing range of a camera module and a laser output range of a laser irradiation module of G3.

R is a location of the robot, and a location at which the robot intends to arrive is "X". The main server 100 may generate a path to be traveled by R through the process of FIG. 6 by using an image photographed at G1.

In one embodiment, the communication unit 180 of the main server 100 may receive an image including a mark disposed on the robot from the camera module of G1. Here, the communication unit 180 may identify that a location of the robot is (2, 15) based on an image photographing direction, an image photographing magnification, a mark size, and the like of the camera module.

In addition, when the mark indicates a front surface or a back surface of the robot, when the mark is disposed around the laser sensor 310, or when two or more marks are disposed on the robot, the main server 100 may identify not only a location of robot but also a direction of the robot in the photographed image.

In addition, the location identifying unit 110 may identify a direction in which the robot is pointing based on a location where a mark is disposed in the robot or a relative location between two or more marks of the robot.

Subsequently, the controller 150 of the main server 100 may generate a movement path based on information about a destination "X" which the robot will reach, absolute location information (2, 15) of the robot, locations G1, G2, and G3 of the laser irradiation modules and irradiation ranges 61, 62, and 63 in which the laser irradiation modules are capable of irradiating a laser.

The generated path is indicated by an arrow in FIG. 7. A map of FIG. 7 represents an actual space as it is, and thus, hereinafter, a laser being output is marked through the map.

FIG. 8 illustrates a process of outputting a path with a laser by a laser irradiation module of G1 according to an embodiment of the present disclosure. The laser irradiation module of G1 may output a path where the robot is capable of travelling as indicated by L1. An output of L1 may be made according to the control of the main server 100 from (2, 14) to (2, 11). The laser sensor of the robot R may identify a laser output onto the floor, and the robot R may travel from (2, 14) to (2, 11).

When the robot R is close to a boundary line between 61 and 62 as a result of the movement, the main server 100 may control also G2 to output a route with a laser. For example, when the robot R reaches a point (2, 12), the main server 100 may control the laser irradiation module of G2, which will be described with reference to FIG. 9.

FIG. 9 illustrates a process of outputting a path with a laser by a laser irradiation module of G2 according to an embodiment of the present disclosure. The laser irradiation module of G2 may output a path where the robot is capable of moving as indicated by L2. An output of L2 may be made according to the control of the main server 100 from (2, 10) to (13, 3). The laser sensor of the robot R may identify a laser output onto the floor, and the robot R may move from (2, 10) to (13, 3).

In addition, when the robot moves to a region of G2, the main server 100 may stop the laser output of the laser irradiation module of G1 so that L1 is no longer marked on the ground.

When the robot R is close to a boundary line between 62 and 63 as a result of the movement, the main server 100 may control also G3 to output a path with a laser. For example, when the robot R reaches a point (12, 4), the main server 100 may control the laser irradiation module of G3, which will be described with reference to FIG. 10.

Figure 10:
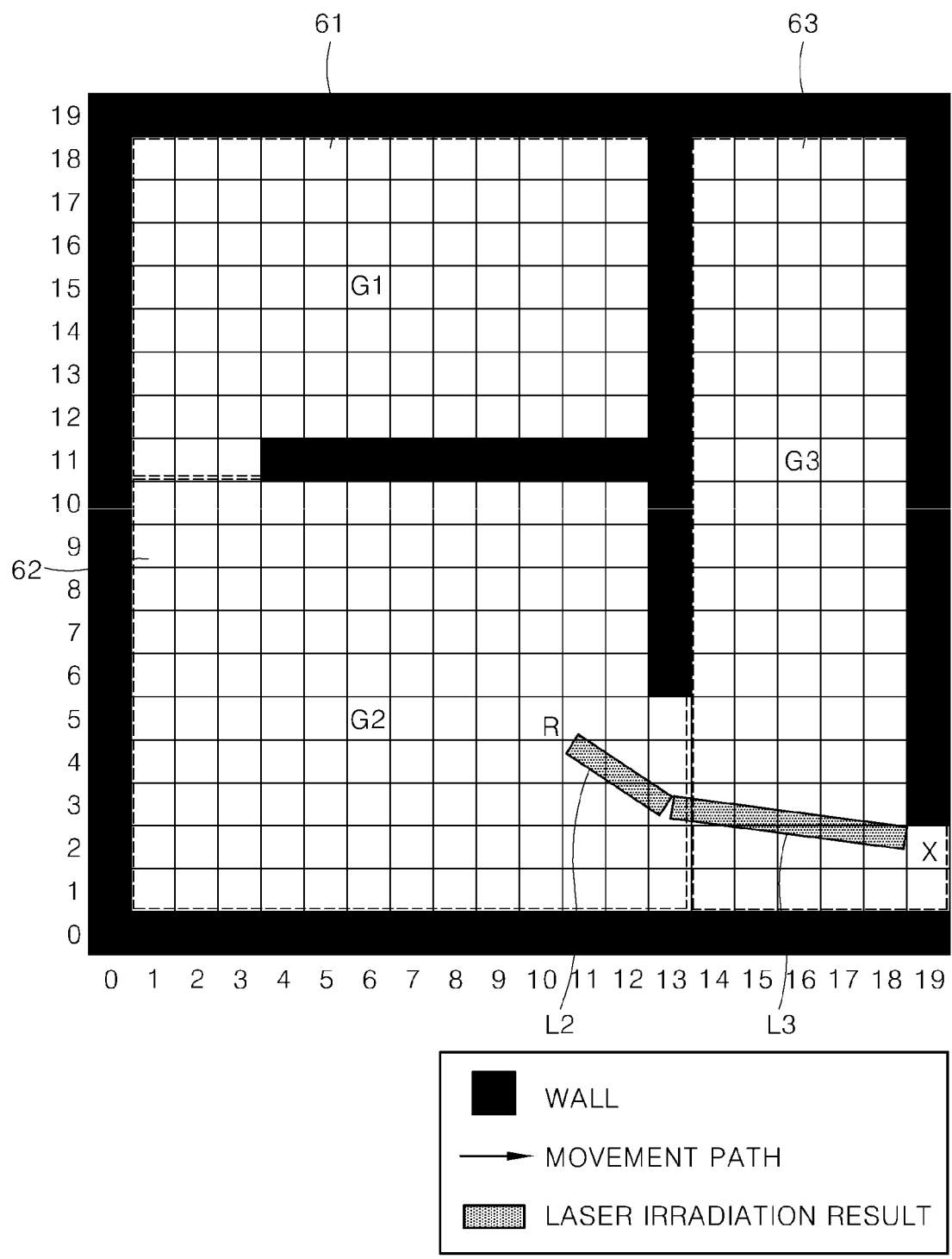
FIG. 10 illustrates a process of outputting a path with a laser by a laser irradiation module of G3 according to an embodiment of the present disclosure.

FIG. 10 illustrates a process of outputting a route with a laser by a laser irradiation module of G3 according to an embodiment of the present disclosure.

A result L2 of laser irradiation previously performed by G2 may be marked only in a travel direction of the robot as the robot moves, and the main server 100 may control G2 so that a previous region which the robot passed is not irradiated with a laser. FIG. 10 illustrates a partial output result of L2. In addition, it can be seen that L3 is output to the destination X by G3. The robot may reach the destination X as a result of traveling to a region of 63 and continuously sensing L3.

When a route is output with a laser onto the ground by three laser irradiation modules as illustrated in FIGS. 8 to 10, the robot may sense the path and move at a high speed.

In addition, the three camera modules may photograph the travel direction of the robot in real time during the travel of the robot, thereby being capable of identifying the current location of the robot.

In addition, the obstacle sensor 256 of the laser irradiation module 200 may identify a signal being returned while outputting a route onto the ground, and when it is determined that an object is closer than the original ground, the obstacle sensor 256 may determine that an obstacle is disposed. The obstacle sensor 256 may notify the main server 100 that the obstacle is disposed. In this situation, the main server 100 may recalculate the path.

That is, a route may be generated primarily in FIGS. 8 to 10. When an obstacle is identified on the path while the generated route is output with a laser onto the ground, the generated path may be immediately corrected by the main server 100 and newly output onto the ground.

FIG. 11 illustrates a result of correcting a path according to an embodiment of the present disclosure. In the embodiment of FIG. 9, an obstacle may be sensed by the camera module or the laser irradiation module while the robot is travelling.

In one embodiment, the camera module of G2 may sense an obstacle which is disposed within a range in which the camera module of G2 is capable of photographing, and the camera G2 may transmit sensed information about the obstacle to the main server 100. The controller 150 of the main server 100 may generate a movement path of the robot by using the sensed information. In one embodiment, the sensed information indicates that an image including a different object in comparison with a previously photographed image is photographed. Alternatively, when the camera module is capable of calculating depth information, the controller 150 may identify that an obstacle is disposed by using the depth information.

That is, the controller 150 may compare a first image previously photographed by the camera module with a second image photographed by the camera module at the present time point, and may analyze a region where a difference occurs therebetween to calculate sensed information indicating that an obstacle is disposed. Here, the controller 150 may calculate a difference between two images generated by an RGB camera module or a difference between depth information of two images generated by a depth camera module. In addition, when a photographing direction or a photographing magnification of the camera module is adjustable, the controller 150 may compare images photographed in the same direction and at the same magnification without conversion. In some implementations, the controller 150 may compare two images through constant conversion when the images are photographed in different directions or at different magnifications.

In another embodiment, the laser irradiation module of G2 may sense obstacle which is disposed within an irradiation range in which the laser irradiation module of G2 is capable of irradiating a laser, and the laser irradiation module of G2 may transmit sensed information about the obstacle to the main server 100. The controller 150 of the main server 100 may generate a movement path of the robot by using the sensed information. In one embodiment, the sensed information indicates that an object is newly disposed by reflecting a laser at a position higher than the ground in the process of irradiating a laser. That is, the controller 150 may store information about heights of respective objects in a laser irradiation region. In one embodiment, the controller 150 may store first height information of objects acquired by the laser irradiation module in the laser irradiation region at a first time point and second height information of objects acquired by the laser irradiation module in the laser irradiation region at a second time point. The controller 150 may compare the first height information and the second height information to identify that an object is newly placed or removed. In addition, the controller 150 may determine that a new obstacle is disposed according to changes in heights of objects.

Therefore, the controller 150 may identify a location of an obstacle that is initially disposed by using information acquired by the camera module and the laser irradiation module to generate a movement path. In addition, the controller 150 may identify a location of a changed obstacle or a location of a newly added obstacle, and may generate a movement path.

The guiding device G2 may transmit location information of a sensed obstacle to the main server 100. The main server 100 may reconfigure a path. As a result, as illustrated in FIG. 11, G2 may output a laser along paths of L2_1 and L2_2.

In FIG. 11, the main server 100 may generate a new path in consideration of a speed and a possible rotational angular velocity of the robot while the robot is travelling so that the robot avoids obstacles.

In addition, in FIGS. 7 to 11, the main server 100 may control the view angle adjusting unit 214 of the camera so that the camera photographs the laser irradiation region to track a moving process of the robot. In this situation, the view angle adjusting unit 214 of the camera may be controlled by the main server 100 to photograph the laser irradiation region while tracking the robot in response to the movement of the robot.

Figure 12:
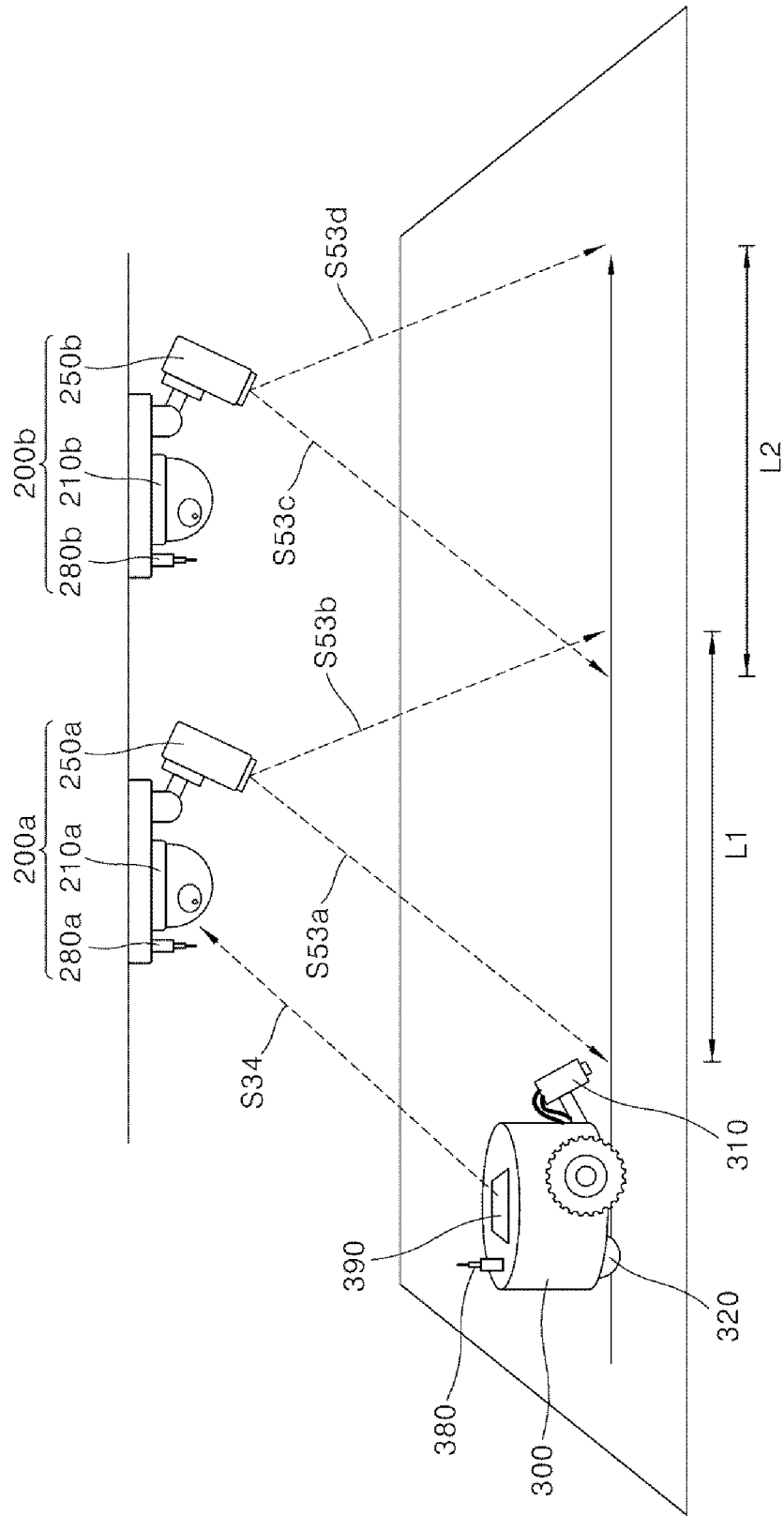
FIG. 12 illustrates a moving process of a robot according to an embodiment of the present disclosure.

FIG. 12 illustrates a moving process of a robot according to an embodiment of the present disclosure. The two guiding devices 200a and 200b may be disposed on the ceiling of FIG. 12. Each of the guiding devices 200a and 200b may include the camera modules 210a and 210b, the laser irradiation modules 250a and 250b, and communication units 280a and 280b.

For example, in FIGS. 7 to 11, the first guiding device 200a corresponding to G1 may recognize and photograph the mark 390 of the robot 300 by vision sensing in step S34, and may transmit a photographed image via the communication unit 280a to the main server 100. Through the steps S35 to S52 of FIG. 6, the laser irradiation module 250 may irradiate a laser as indicated by L1 in steps S53a and S53b. Here, it is possible to improve sensing accuracy by allowing the laser to be irradiated to a vicinity of the laser sensor 310 of the robot 300.

As a result, the robot 300 may travel a distance corresponding to L1 along the sensed laser at a high speed. When the robot 300 approaches a region irradiated by the second guiding device 200b, the second guiding device 200b may output a route as indicated by L2 in steps S53c and S53d. Of course, the main server 100 first may generate a path and transmit information of the path to the two guiding devices 200a and 200b, and the two laser irradiation modules 250a and 250b may simultaneously output L1 and L2, thereby being capable of allowing the robot 300 to move at a high speed.

In FIG. 12, since a plurality of camera modules 210a and 210b are disposed, the changed location of the robot may be continuously photographed by the camera modules 210a and 210b while the robot is moving. The communication unit 180 of the main server 100 may receive an image including the changed location of the robot from the camera modules 210a and 210b.

The controller 150 of the main server 100 may select a second laser irradiation module to output a laser in response to the movement path of the robot. The main server 100 may control transmission of the movement path to the selected second laser irradiation module. Therefore, when a plurality of laser irradiation modules is disposed in a large space, the main server 100 may generate a movement path for each region and transmit the generated movement paths to the laser irradiation modules.

FIG. 13 illustrates an example of a laser output reflecting characteristics of a movement path according to an embodiment of the present disclosure.

The laser irradiation module may output a laser in the shape of a line or a dot according to instructions of the controller 150 of the main server 100. Further, in order to control the speed, a width of the line may be reduced or a size of the dot may be modified.

In addition, a color or frequency of the output laser may be adjusted differently in outputting a route with a laser so that each of the robots travels the route.

In FIG. 13, a method for outputting a path with a laser may be divided into a line output method and a dot output method. When a driving direction is an arrow direction based on the robot R, an output shape of the laser marked in front of the robot may be different according to the speed.

That is, in the situation of a high-speed movement path based on the line output method, the laser irradiation module may output a route with a laser without difference in a width of a line. Conversely, in the situation of a speed-reducing path based on the line output method, the laser irradiation module may output a laser so that the width of the line is reduced. As a result, the robot may slow down when the width of the line decreases while the robot travels along the path output with the laser.

Similarly, in the situation of a high-speed movement path based on the dot output method, the laser irradiation module may output a path with a laser in a dot shape having a predetermined size. Conversely, in the situation of a speed-reducing path based on the dot output method, the laser irradiation module may output a laser so that a spacing of dots increases or lengths of the dots decrease. As a result, the robot may slow down when the spacing of the dots increases or the lengths of the dots decrease while the root travels along the route output with the laser.

FIG. 13 is an example, and the width of the line may be adjusted to be inversely proportional to the moving speed, and sizes or spacing of the dots may also be output as opposed to the example of FIG. 13.

In addition, the main server 100 may store physical characteristics (color, frequency) of a laser to be output for each robot in advance, and may allow the laser irradiation module to output the laser with different colors, different frequencies, or different wavelengths for each robot. The physical characteristics of the laser (shape, color, wavelength, frequency, and the like) may be set in various ways.

Such information may be also transmitted to robots. Thus, even though a robot senses a laser on the ground, when a color or frequency of the sensed laser is not a color or frequency assigned to itself, the robot may not travel along a route output onto the ground.

This implementation may prevent a robot from traveling along a path of another robot when a large number of robots are disposed in a space. In addition, even when an unauthorized laser signal other than the laser irradiation module is marked on the ground, this configuration may allow the robots not to recognize the unauthorized laser signal as a route.

That is, the controller 150 of the main server 100 may control physical characteristics of an output laser of the laser irradiation module in response to the robot.

In addition, the controller 350 of the robot 300 may determine whether a laser output according to physical characteristics of a laser sensed by the laser sensor 310 is corresponding to the robot 300, and the controller 350 may control the driving unit 320 if the physical characteristics of a laser are matched or suitable to robot 300.

In FIG. 13, physical characteristics of a laser for marking a movement path on the ground may include any one or more among a shape, wavelength, frequency, color, and the like of the output laser. That is, it is possible to control the travel speed of the robot by configuring these physical characteristics in various ways.

FIG. 14 illustrates an example of laser irradiation when two marks are disposed on a robot according to an embodiment of the present disclosure.

FIG. 14 illustrates a state in which a first mark 390a indicating a location of the laser sensor 310 and a second mark 390b indicating a location of a back surface or rear of the robot are disposed on an upper surface of the robot.

Based on the images photographed by the camera module, the main server may identify that a path where the robot will move is at the back (arrow direction). However, instead of commanding the robot to move backward, the main server may control the robot to move backward (arrow direction) along the path by scanning the path toward the laser sensor 310 as indicated by L4. As illustrated in FIG. 14, forward and backward directions of the robot may be identified by using two types of marks, thereby being capable of more flexibly irradiating a movement path for controlling the travel of the robot onto the ground of the robot.

In the embodiments of the present disclosure, a path where the robot needs to follow may be irradiated with a laser (for example, a line laser or a dot laser) on the floor surface. This is how the main server interlocked with the camera performs all calculations to provide the robot with a path that is a final result. In addition, the camera may recognize the robot and provide information right in front of the robot via a pan-tilt motion, thereby being capable of using immediately recognizable sensor arrays instead of a vision that requires a lot of calculations.

Therefore, since the robot does not need to perform complicated calculations related to move and the provided path reflects the characteristics of the robot, the robot may perform stable driving even at a high speed without deviation from the path. Further, since the provided information is continuous information such as lines or dots, the robot may stably maintain an operation thereof. In addition, since the robot does not need to rapidly change a direction unless there is a large deviation from the route, it is suitable for high-speed travel.

In addition, in the related art described with reference to FIG. 1, a target point is provided with a point laser, and thus the related art is a technology to provide only a final destination far away from a robot as a point. Therefore, the rest of tasks, such as obstacle recognition and route calculation, should be done by the robot itself, and the robot should be equipped with computing power for this purpose.

That is, the robot may not make a long-term plan for movement, and perform a reactive operation to recalculate on each occasion according to a location of a point. Therefore, there is a technical limitation in that the operation is disconnected when a calculation speed is not fast enough.

However, in the embodiments of the present disclosure, a path itself where the robot needs to follow may be irradiated with a line laser, a dot laser, or the like onto the ground of the travel direction of the robot. All calculations required for this configuration may be performed by a system interlocked with the camera to provide the robot with a path that is a final result, thereby being capable of allowing the robot to move in a quickly manner.

Therefore, according to the embodiments of the present disclosure, the robot may move based on route information provided from the outside even when the robot cannot accurately be aware of an absolute location in a space. When only a point is marked as illustrated in FIG. 1 of the related art, the point may be information for travelling to a specific location in a space, but such point marking may not provide route information for travelling to a corresponding location. However, according to the embodiments of the present disclosure, a route or path for the robot may be marked so that obstacles are avoided and the robot may identify the marked route or path and travel at a high speed.

In particular, the camera module and the laser irradiation module disposed on the wall or the ceiling may identify obstacles disposed in the travel direction of the robot, and thus a movement path may be corrected again even after the movement path is generated.

The embodiments of the present disclosure have been described based on laser irradiation, but the present disclosure is not limited thereto. That is, modules configured to irradiate light having various wavelengths which can be sensed by the robot all correspond to the laser irradiation module of the present disclosure.

According to embodiments of the present disclosure, the movement path may be irradiated with a laser onto the ground in response to the location of the robot, and accordingly the robot may sense and travel the irradiated movement path.

According to embodiments of the present disclosure, the main server may identify the location of the robot via the camera module, calculate a route required for the robot to travel, and transmit the calculated route to the laser irradiation module.

Further, according to embodiments of the present disclosure, the main server may identify obstacles disposed around the robot by using the camera module and the laser irradiation module, and may recalculate the route based thereon.

Effects of embodiments of the present disclosure are not limited to the above-described effects, and those skilled in the art can easily derive various effects of embodiments of the present disclosure from configurations of embodiments of the present disclosure. Other implementations are within the scope of the following claims.

Although all of the elements constituting the embodiments of the present disclosure are described as being integrated into a single one or being operated as a single one, the present disclosure is not necessarily limited to such embodiments. That is, all the elements may be selectively integrated into one or more and be operated as one or more within the scope of the present disclosure. Further, each of the elements may be implemented as independent hardware. Alternatively, some or all of the elements may be selectively combined to be implemented as a computer program having a program module performing some or all functions combined in one or more pieces of hardware. Codes and code segments constituting the computer program may be easily inferred by those skilled in the art to which the present disclosure belongs. The computer program is stored in computer readable media such that the computer program is read and executed by a computer to implement embodiments of the present disclosure. Examples of the storage media of the computer program may include magnetic recording media, optical recording media, and a semiconductor storage device. Further, the computer program implementing the embodiments of the present disclosure may include a program module transmitted in real-time via an external device.

While the foregoing has been given by way of embodiments of the present disclosure, all such and other modifications and variations thereto as would be apparent to those skilled in the art are deemed to fall within the broad scope and ambit of this disclosure as is set forth herein.

What is claimed is:

1. A main server for controlling laser irradiation of a movement path of a robot, the main server is configured to communicate with a camera module and a laser irradiation module, and the main server comprising:
   a controller configured to:
      receive an image of the robot captured by the camera module,
      identify a location of the robot in the image captured by the camera module,
      generate a movement path of the robot based on sensing information, and
      transmit movement path information to the laser irradiation module for outputting the movement path to a vicinity of the robot with a laser for the robot to follow,
   wherein the sensing information includes first information about an obstacle sensed by the camera module or second information about the obstacle sensed by the laser irradiation module,
   wherein the main server is further configured to receive the image including a location of the robot from the camera module,
   wherein the controller is further configured to:
   select a second laser irradiation module based on the location of the robot, and
   transmit the movement path information to the second laser irradiation module for outputting the movement path to the vicinity of the robot with a laser of the second laser irradiation module for the robot to follow, and
   wherein the location of the robot is continuously photographed by the camera module.

2. The main server according to claim 1, wherein the main server is further configured to receive the image including a mark on the robot from the camera module, and
   wherein the controller is further configured to identify the robot's absolute location information in a space based on a location of the camera module and the robot's location information in the image.

3. The main server according to claim 2, wherein the image includes two or more marks on the robot for indicating a direction of the robot, and
   wherein the controller is further configured to identify the direction in which the robot is pointing based on the two or more marks.

4. The main server according to claim 1, wherein the controller is further configured to:
   generate the movement path based on at least one of information about a destination to be reached by the robot, the robot's absolute location information in a space, a location of the laser irradiation module, or an irradiation range of the laser irradiation module.

5. The main server according to claim 1, wherein the controller compares a first image previously photographed by the camera module with a second image photographed by the camera module at a present time point, and the controller calculates a difference between the first image and the second image,
wherein the first information includes the difference between the first image and the second image.

6. The main server according to claim 1, wherein the controller compares first height information acquired by the laser irradiation module in the laser irradiation region at a first time point and second height information acquired by the laser irradiation module in the laser irradiation region after the first time point, and
the controller generates the second information based on whether a new object is placed or the obstacle is removed according to a difference of the first height information and the second height information.

7. The main server according to claim 1, wherein the controller is further configured to adjust physical characteristics of a projection output by a laser of the laser irradiation module for controlling the robot.

8. The main server according to claim 1, wherein the laser irradiation module identifies a signal being returned while outputting the movement path to the vicinity of the robot, and
when the laser irradiation module determines that a new obstacle is closer than a ground portion, then the laser irradiation module notifies the main server of information related to the new obstacle's disposition.

9. A method for controlling laser irradiation of a movement path of a robot, the method comprising:
receiving, by a main server, an image of the robot captured by a camera module;
identifying, by a controller of the main server, a location of the robot in the image captured by the camera module;
generating, by the controller of the main server, a movement path of the robot based on sensing information; and
transmitting, by the main server, movement path information to a laser irradiation module for outputting the movement path to a vicinity of the robot with a laser for the robot to follow,
wherein the sensing information includes first information about an obstacle sensed by the camera module or second information about the obstacle sensed by the laser irradiation module,
wherein the method further comprises:
receiving, by the main server, the image including a location of the robot from the camera module; and
selecting, by the controller of the main server, a second laser irradiation module based on the location of the robot, and transmitting the movement path information to the second laser irradiation module for outputting the movement path to the vicinity of the robot with a laser of the second laser irradiation module for the robot to follow, and
wherein the location of the robot is continuously photographed by the camera module.

10. The method according to claim 9, further comprising:
receiving, by the main server, the image including a mark on the robot from the camera module; and
identifying, by the controller of the main server, the robot's absolute location information in a space based on a location of the camera module and the robot's location information in the image.

11. The method according to claim 10, wherein the image includes two or more marks on the robot for indicating a direction of the robot, and
wherein the method further comprises identifying, by the controller of the main server, the direction in which the robot is pointing based on the two or more marks.

12. The method according to claim 9, further comprising:
generating, by the controller of the main server, the movement path based on at least one of a destination to be reached by the robot, the robot's absolute location information in a space, a location of the laser irradiation module, or an irradiation range of the laser irradiation module.

13. The method according to claim 9, wherein the controller compares a first image previously photographed by the camera module with a second image photographed by the camera module at a present time point, and the controller calculates a difference between the first image and the second image,
wherein the first information includes the difference between the first image or in and the second image.

14. The method according to claim 9, wherein the controller compares first height information acquired by the laser irradiation module in the laser irradiation region at a first time point and second height information acquired by the laser irradiation module in the laser irradiation region at after the first time point, and
the controller generates the second information based on whether a new object is placed or the obstacle is removed according to a difference of the first height information and the second height information.

15. The method according to claim 9, further comprising:
adjusting, by the controller of the main server, physical characteristics of a projection output by a laser of the laser irradiation module for controlling the robot.

16. The method according to claim 9, further comprising:
identifying, by the laser irradiation module, a signal being returned while outputting the movement path to the vicinity of the robot;
determining, by the laser irradiation module, a new obstacle which is closer than a ground portion; and
notifying, by the laser irradiation module, the main server that the new obstacle is newly disposed on a ground portion or in front of the robot.

* * * * *